UNITED STATES PATENT OFFICE.

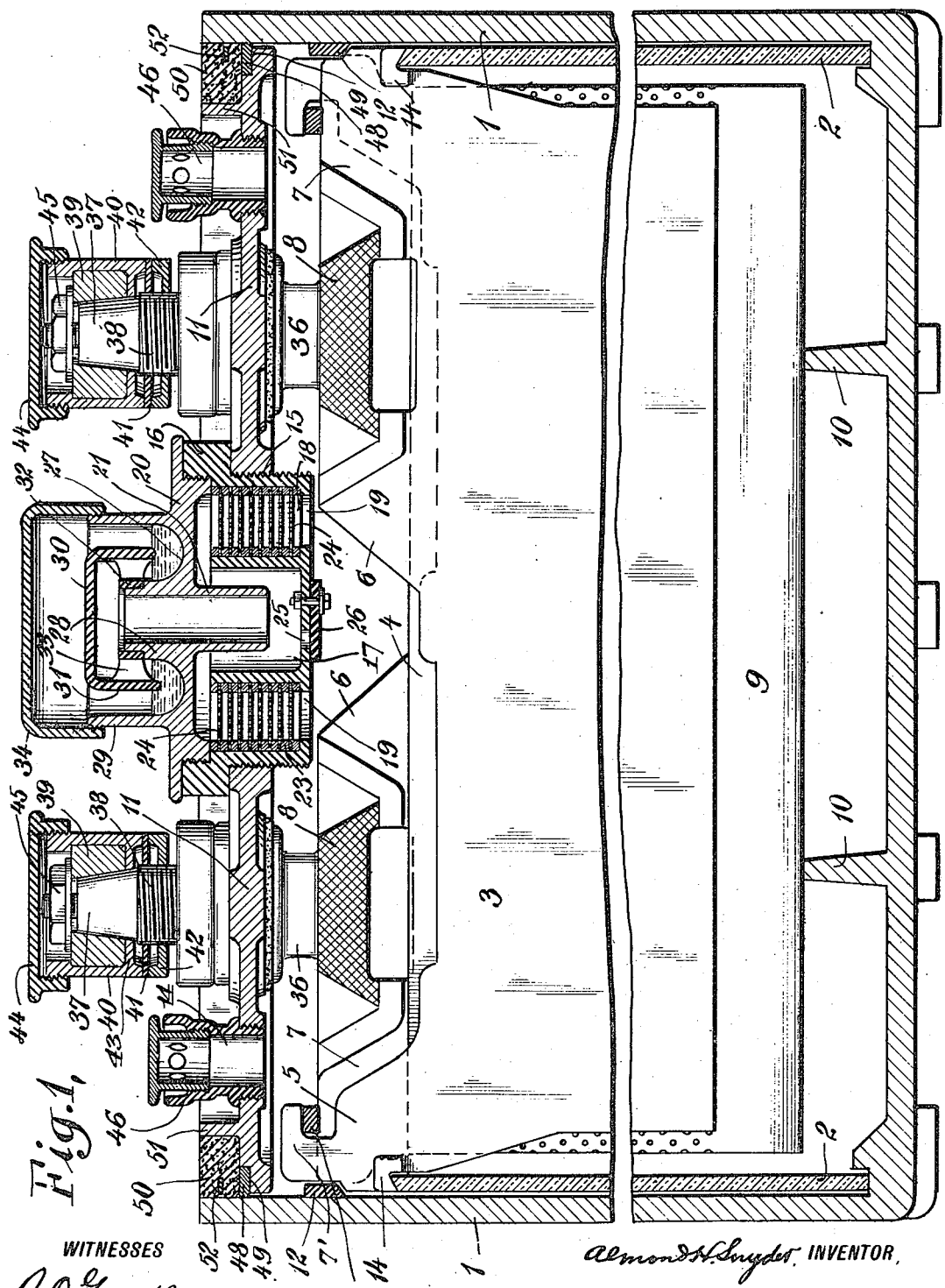

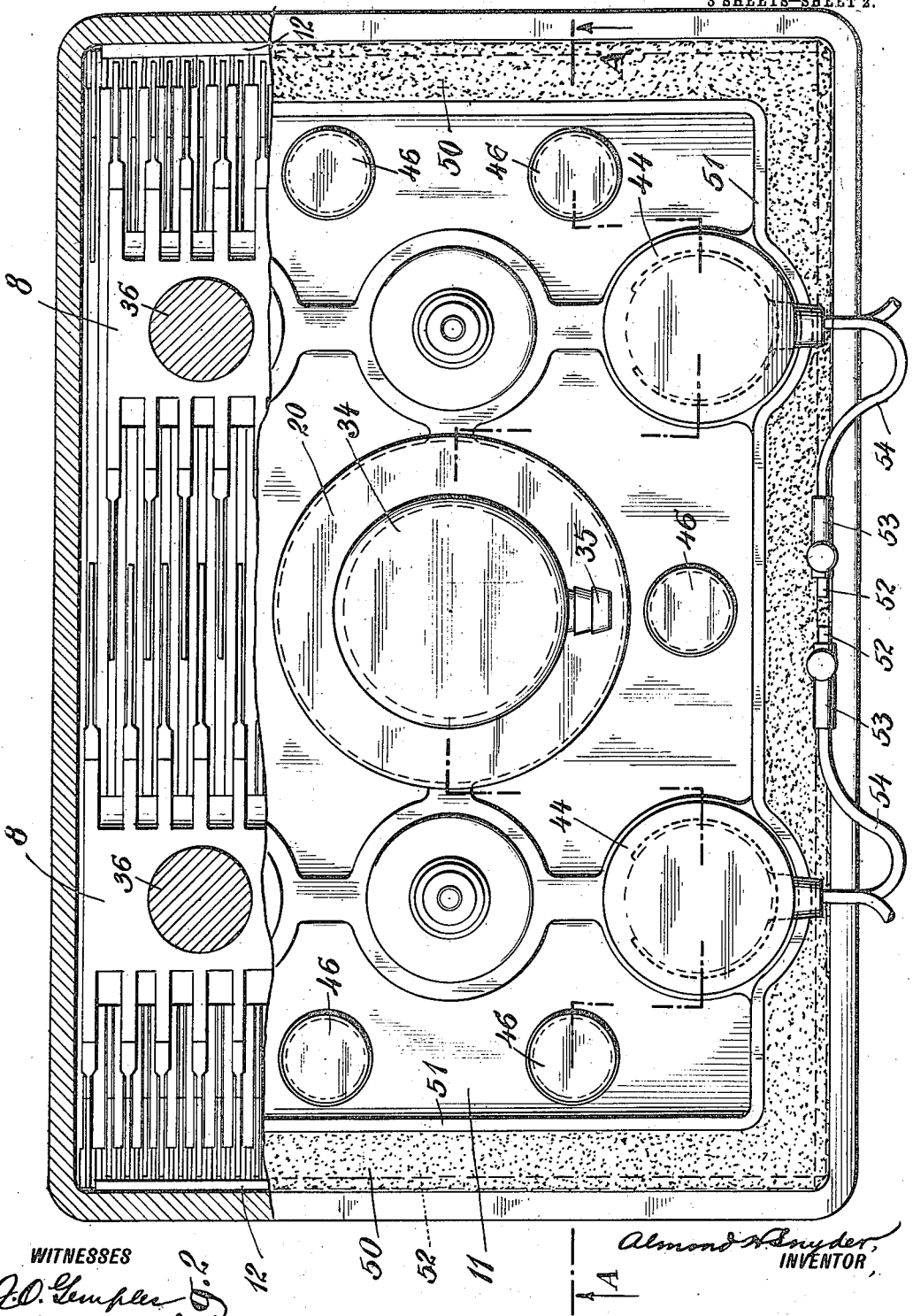

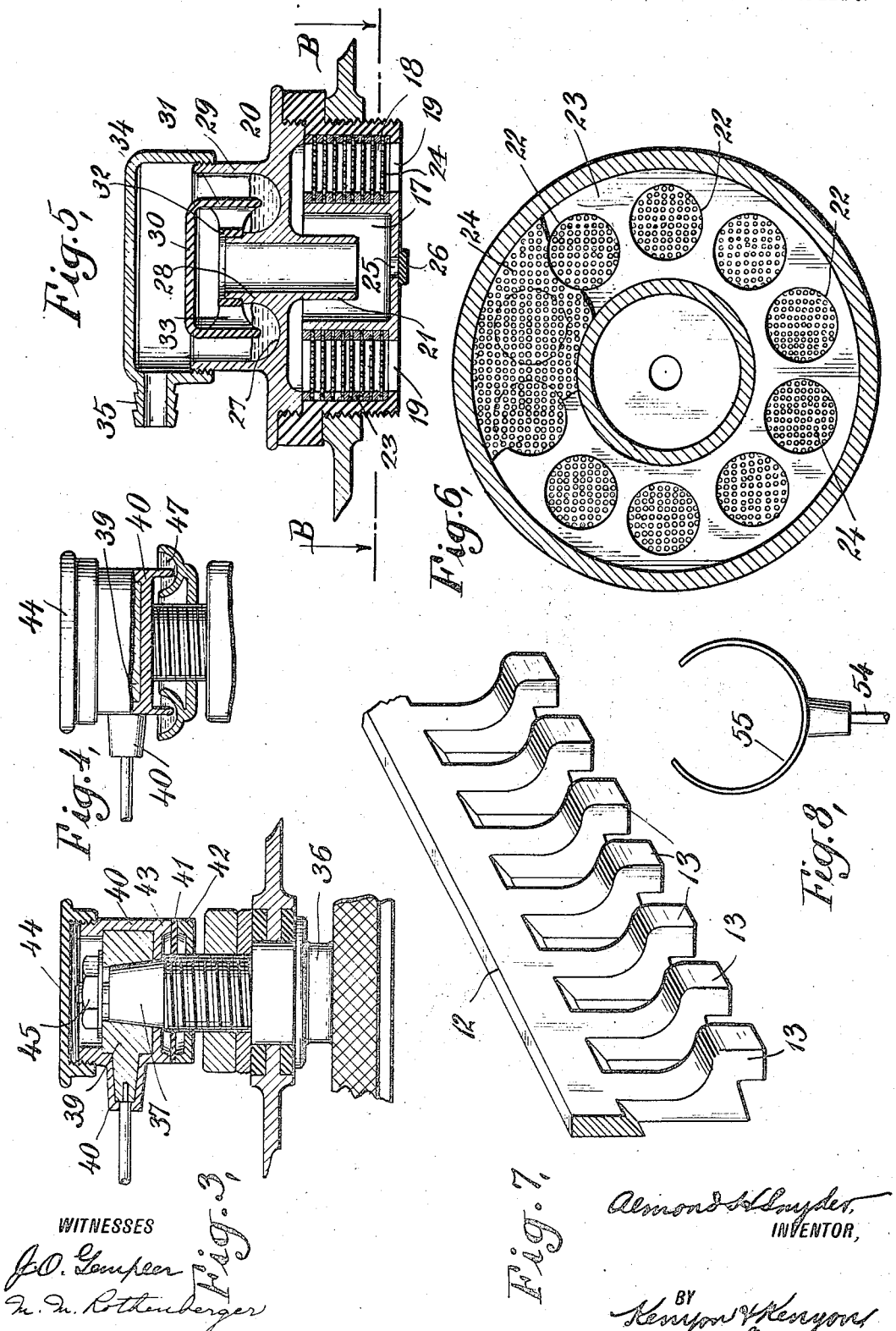

ALMOND H. SNYDER, OF LANCASTER, NEW YORK, ASSIGNOR TO GOULD STORAGE BATTERY COMPANY, A CORPORATION OF NEW YORK.

STORAGE BATTERY.

1,128,275.   Specification of Letters Patent.   Patented Feb. 9, 1915.

Application filed August 15, 1912. Serial No. 715,147.

*To all whom it may concern:*

Be it known that I, ALMOND H. SNYDER, a citizen of the United States, and a resident of Lancaster, in the county of Erie and State of New York, have invented a certain new and useful Improvement in Storage Batteries, of which the following is a specification.

My invention relates to storage batteries, some features of the invention being particularly applicable to storage batteries for submarine use.

One of the objects of my invention is to provide a sealed storage battery especially adapted for submarine use, having an efficient arrangement of inlet and outlet air passages, and to further provide an efficient ventilating structure of durable construction and one which may be, in its preferred embodiment, readily assembled and disassembled for inspection or repairs.

Other features of my invention described in the specification and shown in the drawings but not particularly pointed out and claimed in the appended claims, form the subject matter of co-pending divisional applications.

Further objects, features and advantages will more clearly appear from the detailed description given below taken in connection with the accompanying drawings which form a part of this specification.

In the drawings, Figure 1 is a vertical section taken on the line A—A of Fig. 2, of a battery cell embodying my improvements in one form. Fig. 2 is a plan view of the cell shown in Fig. 1, the cover being broken away to show the battery plates within the cell. Fig. 3 is a vertical section of one of the battery terminals, taken at right angles to the view in Fig. 1. Fig. 4 is a view partly in section, of a modified form of battery terminal. Fig. 5 is a vertical section of the central outlet passage, taken at right angles to the view in Fig. 1. Fig. 6 is a transverse section of the same, taken on the line B—B of Fig. 5. Fig. 7 is a perspective of the rubber separating strip. Fig. 8 is a detail view of one of the connection pieces to be connected to the battery terminals.

Referring to the various figures, 1 represents a hard rubber battery jar provided at its sides with glass plates 2 with beveled tops supporting the positive and negative battery plates 3 and 4. The plates 3 and 4 are each provided with upwardly extending lugs 5, 6 and 7, the lugs 6 and 7 being lead burned to negative and positive bus bars 8, respectively. Between the positive and negative plates 3 and 4 are placed separating strips 9 resting upon supports 10 integral with the bottom of the jar 1. The cell or jar is closed by a cover 11 and the positive and negative plates 3 and 4 are held spaced apart at the points where they are supported by the glass plates 2, by rubber separating strips 12. These rubber separating strips are provided with downwardly extending teeth 13 which lie between the supporting lugs 14 of the plates 3 and 4.

To prevent the plates from canting when being lifted out of the jar, each plate at its end opposite from its terminal connection is provided with an upwardly projecting hook-shaped lug 7', and in connection with these lugs 7' bars 7'' are provided one for each end of the plates to be slipped between the hook-like projections and the upper edges of the adjacent plates, and these bars are slipped in place before the plates are to be lifted. With these bars in place the free ends of the plates having the hooked projection are supported from canting by engagement of their hooked lugs with the bar which in turn is carried on the upper edges of the alternative plates having terminal connections at that end.

The center of the cover 11 is provided with an opening at 15 into which is removably fitted and secured, by being screw threaded therein, a member 16 comprising an expansion or catch basin 17 surrounded by an annular trough 18, the trough having a series of ventilating openings 19 in the bottom thereof. A detachable cover piece 20 bridges or extends over the basin and the openings in the bottom thereof to form a communicating passage over the tops of the trough and the basin, from the openings to the basin. The cover piece is provided with a central hollow depending portion 21 extending down into the basin below the top of the basin to form an air outlet opening for the basin. The ventilating passages extend up in alinement with the openings 19 in the bottom, to form ventilating ducts through openings 22 in annular spacing members 23, which lie between and space apart perforated hard rubber annular baffling plates 24, substantially to the top of the basin and trough, so that the bottom of the basin extends below the top of the openings. The baffle plates or diaphragms 24 are arranged horizontally across the openings 22 and 19 in the annular trough, so as to cover the openings in the bottom of the trough, and are of substantially the same width and length as the trough, as also are the spacing pieces 23. Thus a passage is formed through the cover connecting with the interior of the jar through the baffle plates 24, the openings in the spacing rings 23 and the openings 19 in the bottom of the trough, registering with one another. The opening 25 in the bottom of the basin is normally closed by a resilient cover or valve of leather, 26, adapted to permit liquid to flow from the basin into the jar.

The cover piece 20 is provided with an annular trough 27 on its top, formed by and between a central hollow portion 28 projecting upwardly from the cover piece and the upwardly projecting annular flange 29 surrounding the central projection, so that the central air passage extends up through the center of the trough. A cap 30 is supported above the central projection 28 and its opening, and covers the same and is provided with an annular flange 31 which extends down into water or other suitable liquid in the trough to form a liquid seal. The cap 30 is held in place by being provided with an annular portion 32 connected therewith by means of arms 33, the portion 32 being screw threaded upon the portion 28. A cap 34 is screw threaded upon the flange 29 in order to cover the whole device. The cap 34 is provided with a nipple 35 which is adapted to be secured to a piece of rubber tubing to which suction may be applied in order to withdraw the gases from within the battery jar.

From the bus bars 8 there extend terminals 36. These terminals extend up through the cover 11 and are provided at their top with a tapered portion 37 and a lower screw threaded portion 38. Each terminal is fitted about the tapered portion 37 with a connection piece 39 of copper. A molded protective covering 40 of lead alloy surrounds the connecting portions of the terminal and connection piece to prevent corrosion of the same. A gasket 41 fits on the terminal below the connecting portion and a nut or screw threaded member 42 works on the screw threads on the terminal to engage the gasket and force it into engagement with the adjacent portion or depending flange 43 surrounding the terminal, the flange 43 being integral with the protective covering 40 so that a tight joint is formed between the gasket and adjacent portion of the covering. A removable cap piece 44 is screw threaded on the protective covering to close the opening in the top of the covering above the terminal. The tapering connecting portion of the terminal projects up through the opening in the protective covering and through the tapering opening in the connection piece 39, the latter being held down on the terminal by nut 45 so that the protecting covering and connection piece may be removed from the terminal upon removing the cap 44 and nut 45. The cover of the jar is provided with air inlet openings 46 near two of its opposite ends, the outlet passage being centrally located and the terminal openings through which the terminals 36 pass being located between the outlet duct at the center, and the inlet openings 46. The inlet openings or ducts extend above the cover of the jar but the tops thereof are below the connection pieces 39.

Referring to Fig. 4, the terminal connection there shown is modified, in that instead of being provided with a gasket 41 a liquid seal 47 is provided for the bottom of the covering 40 so that injurious gases will not be permitted to attack the connection pieces 39.

In order that the cover 11 may be tightly fitted to the jar 1 a strip of flexible material 48, such as soft rubber, extends around the cover lying in a groove 49 therein at the edges of the cover. The material 48 tightly fits against the inner walls of the jar, forming a tight joint therebetween and the cover.

A sealing compound 50 of some suitable bituminous or asphalt composition which will soften at a high temperature extends around the edges of the cover for sealing the cover more thoroughly to the jar. The ridge 51 formed on the cover and extending above the grooves 49 confines the sealing compound between the ridge and the inner walls of the jar. A conductor 52 is embedded in the sealing compound, the battery terminals on the cover being connected in circuit with the conductor 52 by means of connection pieces 53, secured to conductors 54, which latter conductors are connected to the terminals by means of spring clip connection devices 55 (see also Fig. 8).

By providing the connecting portions of the terminals 37 and the connection pieces 39 with a lead alloy covering such as an alloy of lead and antimony, the connection portions are protected from corrosion in a most efficient manner.

In order to keep the cell free of gases suction is applied through any suitable means such as rubber tubing, to the nipple 35, whereupon air is drawn in through the inlet vents 46 and out through the outlet passage extending up through the openings 19 and 22 and the perforated baffle plates 24, thence into the basin 17 where any liquid which may be carried by the baffle plates is caught, thence up through the hollow portions 20 and 28 and through the liquid seal in the trough 27, and thence up under the cap 34 and out through the nipple 35.

When it is desired to unseal the battery it is only necessary to connect the conductors 54 to conductor 52 by means of the connection pieces 53, and with the battery terminals by means of the spring clips 55, whereupon the battery will furnish current to the conductor 52 which becomes then sufficiently heated to melt the sealing compound so that the cover may be easily removed.

Although I have described my improvements in great detail and with respect to a certain particular embodiment thereof, nevertheless I do not desire to be limited to such details except as clearly specified in the appended claims since many changes and modifications may well be made without departing from the spirit and scope of my invention in its broader aspects.

Having thus described my invention, what I claim as new and desire to secure by Letters Patent, is:

1. In a storage battery, the combination of a jar, a plurality of positive and negative plates arranged therein, terminals for said plates, a cover fitting the jar and having openings through which the terminals extend, and having one or more air inlet openings near two of its opposite edges, and a central air outlet opening.

2. The combination of a storage battery cover provided with an expansion basin and with one or more openings arranged around said basin, the bottom of the basin extending below the tops of the openings, a part bridging the tops of said opening or openings and basin to provide an unobstructed space over the top of the same through which they communicate, and an opening through the bridging part over the basin forming an air outlet passage from the basin to the atmosphere.

3. The combination of a storage battery cover having a catch basin therein with a trough surrounding the same and communicating with the upper end thereof, said trough being provided with a series of openings through its bottom, a series of perforated baffle plates arranged horizontally within the trough one above the other so as to cover the openings in the trough, means for spacing the plates apart, and a part extending over the trough and basin to cover the same and having an air outlet opening from the basin therethrough.

4. The combination of a storage battery cover having a series of openings therethrough and having a catch basin around which the openings are spaced and with which the openings communicate, said basin having an opening in the bottom thereof, a cover for the opening adapted to permit liquid to flow out of the basin into the battery jar, and a part extending over said openings and basin and having an opening therethrough communicating with the basin and forming an air outlet passage from the basin.

5. The combination of a storage battery cover having a catch basin therein with a series of ventilating openings spaced around the same, the bottom of the basin being below the tops of the openings, a series of perforated hard rubber plates extending across the openings, spacing pieces holding said plates apart, and a detachable cover piece for the openings and basin forming a communicating air passage over the tops of the same, said cover piece having an air outlet opening communicating with the basin.

6. The combination of a storage battery cover having a catch basin therein with a trough surrounding the same, said trough being provided with a series of openings through its bottom, a series of perforated baffle plates arranged horizontally within the trough one above the other so as to cover the openings in the trough, means for spacing the plates apart, and a part extending over the trough and basin to cover the same and forming a communicating air passage over the tops of the trough and basin, said part having an air outlet opening therethrough.

7. The combination of a storage battery cover having a catch basin therein with a trough surrounding the same, said basin having an opening in the bottom thereof, a cover for the opening adapted to permit liquid to flow out of the basin into the battery jar, said trough being provided with a series of openings through its bottom, a series of perforated baffle plates arranged horizontally within the trough one above the other so as to cover the openings in the trough, means for spacing the plates apart, and a part extending over the trough and basin to cover the same and forming a communicating air passage over the tops of the trough and basin, said part having an air outlet opening therethrough.

8. The combination of a storage battery cover having a catch basin therein with a trough surrounding the same, said trough being provided with a series of openings through its bottom, a series of perforated baffle plates arranged horizontally within the trough one above the other so as to cover the openings in the trough, means for spacing the plates apart, and a detachable cover piece for the trough and basin forming a communicating air passage between the tops of the same, said cover piece having an air outlet opening therethrough above the basin.

9. The combination of a storage battery cover having a catch basin therein with a trough surrounding the same and with which the basin communicates, said basin having an opening in the bottom thereof, a cover for the opening adapted to permit liquid to flow out of the basin into the battery jar, said trough being provided with a series of openings through its bottom, a series of perforated baffle plates arranged horizontally within the trough one above the other so as to cover the openings in the trough, means for spacing the plates apart, and a cover piece extending over the trough and basin to cover the same and having an air outlet opening therethrough communicating with the basin and forming an air outlet passage from the same.

10. The combination of a storage battery cover having a catch basin therein with a trough surrounding the same and communicating therewith and provided with a series of openings through its bottom, a series of perforated baffle plates of substantially the width and length of the trough fitting within the same, a series of spacing pieces for the plates of substantially the width and length of the plates fitting within the trough between the plates and having openings therethrough in alinement with the openings in the bottom of the trough to form ventilating air passages through the trough, and a cover piece extending over the air passages and basin to cover the same and having an air outlet opening therethrough communicating with the basin and forming an air outlet passage therefrom.

11. The combination of a storage battery cover having a catch basin therein with a trough surrounding the same and having a series of openings through its bottom, a series of perforated baffle plates of substantially the width and length of the trough fitting within the same, a series of spacing pieces for the plates of substantially the width and length of the plates fitting within the trough between the plates and having openings therethrough in alinement with the openings in the bottom of the trough to form ventilating air passages, and a detachable cover piece fitting over the passages and basin and forming a communicating air passage between the tops of the same, said cover piece having a hollow depending portion extending within the basin below the top of the same and providing an air outlet opening therefrom.

12. The combination of a storage battery cover having an annular trough therein provided with a series of openings arranged in its bottom, a series of annular perforated baffle plates arranged horizontally along the trough, a series of annular spacing rings arranged between the plates and provided with openings registering with the openings in the bottom of the trough to form air passages through the trough, and a cover piece fitting over the trough and having an air outlet opening communicating with the openings through the trough.

13. The combination of a storage battery cover having a catch basin therein with an annular trough surrounding the same and communicating therewith at its top portion, said trough having a series of openings arranged in its bottom, a series of annular perforated baffle plates arranged horizontally along the trough, a series of annular spacing rings arranged between the plates and provided with openings registering with the openings in the bottom of the trough to form air passages through the trough, and a cover piece fitting over the air passages and basin and provided with an air outlet opening communicating with the basin.

14. The combination of a storage battery cover having an opening therethrough, means fitting within the opening and removably secured therein and having a catch basin and a series of ventilating openings surrounding and communicating with the same, the bottom of the basin extending below the tops of the openings, one or more perforated diaphragms extending across the openings surrounding the basin, and a part extending over the tops of said openings and basin and having an opening therethrough forming an air outlet passage from the basin to the atmosphere.

15. The combination of a storage battery cover having an opening therethrough, means fitting within the opening and removably secured therein and having a catch basin and a series of ventilating openings surrounding the same, the bottom of the basin extending below the tops of the openings, and a detachable cover piece for the openings and basin forming a communicating air passage between the tops of the same, said cover piece having a hollow portion extending within the basin below the tops of the openings and forming an air outlet from the basin.

16. The combination of a storage battery cover having an opening therethrough, means fitting within the opening and removably secured therein and having a catch basin and a series of ventilating openings surrounding the same, the bottom of the basin extending below the tops of the openings, a series of hard rubber perforated baffle plates extending across the openings, spacing pieces holding said plates apart, and a detachable cover piece for the openings and basin forming a communicating air passage over the tops of the same, said cover piece having an air outlet opening communicating with the basin.

17. The combination of a storage battery jar, a cover for the jar having an opening therethrough, means fitting within said opening and removably secured therein and having a catch basin and a trough surrounding the same, said trough being provided with a series of openings through its bottom communicating with the interior of the jar, a series of perforated baffle plates arranged horizontally within the trough one above the other so as to cover the openings in the trough, means for spacing the plates apart, and a part extending over the trough and basin to cover the same and forming a communicating air passage over the tops of the same, said part having an air outlet opening therethrough.

18. The combination of a storage battery jar, a cover for the jar having an opening therethrough, means fitting within said opening and removably secured therein and provided with an annular trough, said trough being provided with a series of openings through its bottom communicating with the interior of the jar, a series of annular perforated baffle plates arranged horizontally along the trough, a series of annular spacing rings arranged between the plates and provided with openings registering with the openings in the bottom of the trough to form air passages through the trough, and a cover piece fitting over the trough and having an opening therethrough communicating with the air passages through the trough.

19. The combination of a storage battery jar, a cover for the jar having an opening therethrough, means fitting within said opening and removably secured therein and having a catch basin and an annular trough surrounding the same, said trough being provided with a series of openings through its bottom communicating with the interior of the jar, a series of annular perforated baffle plates arranged horizontally along the trough, a series of annular spacing rings arranged between the plates and provided with openings registering with the openings in the bottom of the trough to form air passages through the trough, and a cover piece fitting over the air passages and basin and forming a communicating air passage therebetween and provided with an air outlet opening.

20. The combination of a storage battery jar, a cover for the jar having an opening therethrough, means fitting within said opening and removably secured therein and having a catch basin and an annular trough surrounding the same, said basin having an opening in its bottom, a resilient cover for the opening adapted to permit liquid to flow from the basin into the battery jar, said trough being provided with a series of openings through its bottom communicating with the interior of the jar, a series of annular perforated baffle plates arranged horizontally along the trough, a series of annular spacing rings arranged between the plates and provided with openings registering with the openings in the bottom of the trough to form air passages through the trough, and a cover piece fitting over the air passages and basin and forming a communicating air passage therebetween and provided with an air outlet opening.

21. The combination of a storage battery jar, a cover for the jar having an opening therethrough, means fitting within said opening and removably secured therein and having a catch basin and an annular trough surrounding the same, said trough being provided with a series of openings through its bottom communicating with the interior of the jar, a series of hard rubber annular perforated baffle plates arranged horizontally along the trough, a series of annular spacing rings arranged between the plates and provided with openings registering with the openings in the bottom of the trough to form air passages through the trough, a detachable cover piece fitting over the air passages and basin and forming a communicating air passage therebetween, and a hollow depending portion extending from the cover piece down into the basin below the top of the same and forming an air outlet opening therefrom.

22. The combination of a storage battery cover, a plug for the cover having one or more openings therethrough, a cover-piece for the openings having a central opening therethrough out of alinement with the opening or openings through the plug, a trough for liquid surrounding said central opening and extending below the top of the same and means for preventing the flow of gases from the upper end of the central opening except through the liquid, said means including a flange extending from the outlet end of the central opening down into the liquid in the trough to form a liquid seal.

23. The combination of a storage battery cover, a plug secured to the cover with one or more openings therethrough, a detachable cover-piece for the openings having a central hollow portion projecting upwardly therefrom, said hollow portion being out of alinement with the opening or openings through the plug, an upwardly projecting flange surrounding the projection of said hollow portion and forming therewith a trough for liquid around the same, and a cap supported on the upper end of the hollow portion and having a depending flange extending into the liquid in the trough to form a liquid seal.

24. The combination of a storage battery cover plate, having an opening therein, a cover piece for said opening having an opening therethrough, flanges on said cover piece and forming therewith a trough surrounding said opening therein, a hollow cap extending over, spaced from, and detachably supported upon one of said flanges, the edge of said cap extending between said flanges whereby a liquid seal is formed when liquid is placed in said trough.

25. The combination of a cover plate for a storage battery provided with an opening, a detachable cover piece for said opening and associated with said cover plate, and having an opening therein, said plate being formed with a trough in one face surrounding said last-named opening, a cap extending over, spaced from and supported by the inner wall of said trough, the edge of said cap extending below the tops of the walls of said trough, whereby a liquid seal is formed when liquid is placed in the trough, and a cap detachably fitting onto the outer wall of said trough and provided with an opening.

26. The combination of a storage battery cover provided with an opening, a detachable cover piece secured therein and provided with an opening, a flange on said cover piece surrounding said last-named opening and extending upwardly from said cover piece, a second flange surrounding and spaced from said first-named flange, a cap extending over and spaced from said first-named flange and extending between said flanges to a point near said cover piece, whereby a liquid seal is formed when liquid is placed between said flanges.

27. The combination of a cover for a storage battery provided with an opening, a cover piece for said opening and provided with an opening therethrough, flanges on said cover piece surrounding said last-named opening and extending from both sides of said cover piece, a flange on said cover piece surrounding and spaced from one of said first-named flanges, a cap extending over, spaced from and supported by the same first-named flange, the edge of said cap extending between the two last-named flanges to a point near the cover piece, whereby a liquid seal is formed when liquid is placed between said two last-named flanges.

28. The combination of a cover plate for a storage battery provided with an opening, a cover piece for said opening associated with said cover plate and having an opening therein, flanges on said cover piece surrounding said opening and extending from both sides of said cover piece, a cap extending over, spaced from and supported by one of said flanges, a flange on said cover piece surrounding and spaced from said cap, whereby a seal is formed when liquid is placed between said two last-named flanges, and a cap fitting on said last-named flange and provided with an outlet.

29. The combination of a storage battery cover, a detachable plug for the cover provided with an expansion basin with one or more openings arranged around said basin, a cover piece for the basin having an opening therethrough in alinement with the basin, a trough for liquid surrounding the opening through the cover piece and extending below the top of the same, and means for preventing the flow of gases from the upper end of said last opening except through the liquid, said means including a flange extending from the outlet end of said opening down into the liquid in the trough to form a liquid seal.

30. The combination of a storage battery cover having a catch basin therein and a series of ventilating openings surrounding the same, the bottom of the basin being below the tops of the openings, a cover piece for the openings and basin forming a communicating air passage between the tops of the same, the cover piece having a central hollow portion projecting upward therefrom, an upwardly projecting flange surrounding said central projection and forming therewith a trough for liquid around the same, a cap supported above the central projection, and a depending flange from the cap extending into the liquid in the trough to form a liquid seal.

31. The combination of a storage battery cover having a catch basin therein with a trough surrounding the same, said trough being provided with a series of openings through its bottom, a series of perforated baffle plates arranged horizontally within the trough one above the other so as to cover the openings in the trough, means for spacing the plates apart, a part extending over the top of the trough to cover the same, a central hollow portion projecting upward from said part and having an opening therethrough communicating with the openings in the trough, a flange projecting upwardly from said part and surrounding the hollow portion and forming therewith a trough for liquid, a cap supported above the central projecting portion, and a flange extending down from the cap into the liquid in the trough to form a liquid seal.

32. The combination of a storage battery cover having a catch basin therein with a trough surrounding the same, said trough being provided with a series of openings through its bottom, a series of perforated baffle plates arranged horizontally within the trough one above the other so as to cover the openings in the trough, means for spacing the plates apart, a part extending over the trough and basin to cover the same and forming a communicating air passage over the tops of the same, a central hollow portion projecting upward from said part and downward therefrom into the basin, below the top of the trough, a flange projecting upwardly from said part and surrounding the hollow portion and forming therewith a trough for liquid, a cap supported above the central projecting portion, and a flange extending down from the cap into the liquid in the trough to form a liquid seal.

33. The combination of a storage battery cover having a catch basin therein with a trough surrounding the same, said basin having an opening in the bottom thereof, a resilient cover for said opening adapted to permit liquid in the basin to flow into the battery jar, said trough being provided with a series of openings through its bottom, a series of perforated baffle plates arranged horizontally within the trough one above the other so as to cover the openings in the trough, means for spacing the plates apart, a part extending over the trough and basin to cover the same and forming a communicating air passage over the tops of the same, a central hollow portion projecting upward from said part and also downward therefrom into the basin, below the top of the trough, a flange projecting upwardly from said cover part and surrounding the hollow portion and forming therewith a trough for liquid, a cap supported above the central projecting portion, and a flange extending down from the cap into the liquid in the trough to form a liquid seal.

34. The combination of a storage battery jar, a cover for the jar having an opening therethrough, means fitting within said opening and removably secured therein and having a catch basin with an annular trough surrounding the same, said trough being provided with a series of openings through its bottom communicating with the interior of the jar, a series of hard rubber annular perforated baffle plates arranged horizontally along the trough, a series of annular spacing rings arranged between the plates and provided with openings registering with the openings in the bottom of the trough to form air passages through the trough, a detachable cover piece fitting over the air passages and basin and forming a communicating air passage therebetween, a central hollow portion projecting upward from the cover piece and downward therefrom into the basin below the top of the trough, a flange projecting upwardly from the cover piece and surrounding the hollow portion and forming therewith a trough for liquid, a cap supported above the central projecting portion, and a flange extending down from the cap into the liquid in the trough to form a liquid seal.

35. The combination of a storage battery jar, battery plates within the jar, a cover for the jar having air inlet openings near two of its opposite ends and having a central air outlet duct and terminal openings between the outlet duct and the inlet openings, and terminals connected with the plates at their opposite ends between the outlet duct and the inlet openings and extending through the terminal openings.

In testimony whereof, I have signed my name to this specification, in the presence of two subscribing witnesses.

ALMOND H. SNYDER.

Witnesses:
P. W. ENGLISH,
L. METZEN.